(12) United States Patent
Weiss

(10) Patent No.: US 6,351,695 B1
(45) Date of Patent: Feb. 26, 2002

(54) VERIFIED COMMON CARRIER TRUCK OPERATION LOG

(76) Inventor: Ronald Weiss, 2131 Wantagh Ave., Wantagh, NY (US) 11793

( * ) Notice: Subject to any disclaimer, the term of this patent is extended or adjusted under 35 U.S.C. 154(b) by 0 days.

(21) Appl. No.: 09/296,750

(22) Filed: Apr. 23, 1999

(51) Int. Cl.[7] .............................. G06F 7/00; G06F 19/00
(52) U.S. Cl. ............................ 701/35; 701/24; 701/36; 701/49; 340/5.8; 340/5.82; 340/5.83
(58) Field of Search .............................. 701/29, 30, 31, 701/33, 35, 36, 24, 49; 340/425.5, 438, 463, 426, 5.8, 5.81, 5.82, 5.83; 382/124, 312; 310/318; 702/178; 235/382, 382.5, 375

(56) References Cited

U.S. PATENT DOCUMENTS

| 4,394,773 A | 7/1983 | Ruell .......................... 382/124 |
| 5,740,548 A | 4/1998 | Hudgena ...................... 701/35 |
| 6,198,996 B1 * | 3/2001 | Berstis ........................ 701/49 |

* cited by examiner

Primary Examiner—William A. Cuchlinski, Jr.
Assistant Examiner—Gertrude Arthur

(57) ABSTRACT

For a computer-monitored operation of a common carrier truck currently mandated by law to limit a driving shift to ten hours per driver to minimize accidents due to driver fatigue, replacing a manual input of the driver's identification per shift with a driver-identifying fingerprint sensor to provide verification of both driver and truck operation resulting from the inherent tamperproof accuracy of the computer and fingerprint sensor.

1 Claim, 2 Drawing Sheets

VERIFIED COMMON CARRIER TRUCK OPERATION LOG

The present invention generally relates to improvements in the production of a log of a common carrier truck reporting the time intervals of driving operation and rest periods as mandated by law to avoid driver fatigue and, more particularly, to improvements which verify the content of the log and, once such verification becomes known to the driver, contributes to voluntary compliance with the mandated requirements.

EXAMPLE OF THE PRIOR ART

BACKGROUND OF THE INVENTION

FIELD OF THE INVENTION

It is known from government agency reports, as exemplified by the report of the Federal Highway Administration that 5,126 highway accidents involving common carrier trucks occurred in 1996, and it is believed, based on studies of the circumstances of the accidents that the vast majority were due to driver fatigue, either driving longer that the allotted time, typically ten hours, and/or not resting for the allotted time, typically eight hours, before resuming driving.

Addressing the aforesaid problem, it is well documented in the patented literature, as exemplified by U.S. Pat. No. 5,740,548 for Driver Safety Parameter Display Apparatus issued to Hudgens on Apr. 14, 1998, to embody the truck with a computer which monitors the time durations of initial operation and resumed operation, and downloads these monitored events in a printed log which being computer-produced cannot be readily altered by the driver, his employer, or like individual having a motivation to do so.

On a long cross country run, it is not uncommon to provide a primary driver and an assistant driver, each driving a ten hour shift and these shifts being taken consecutively, wherein the non-driving driver complies with the rest period while a passenger enroute.

It is known however from common experience and also from accident investigations, that the log reporting two drivers is not always accurate in that drivers, in the parlance of the trade, was often a "phantom" driver, i.e. one that did provide a ten hour driving shift. The ascribing heretofore of drivers per shift lacked the computer verification of its inherent operation because this circumstance of the identification of the drivers is not a factor monitored by the computer, but rather is information manually, so to speak, entered into the log by the driver or by an employer to circumvent the expenses of complying with applicable government regulations.

SUMMARY OF THE INVENTION

This specific problem of non-compliance is recognized in the previously noted '548 patent, and the solution recommended is to embody the truck computer with circuitry operating a "tamper" signal in the event that a one-driver assignment entered into the computer is changed to a two-driver assignment. This solution is difficult to implement, and changes in assignments either initially or enroute are not prohibited by law and should be permitted, provided only that the regulations of driving and rest period intervals are complied with.

Broadly, it is an object of the present invention to provide a common carrier truck computer-produced log overcoming the foregoing and other shortcomings of the prior art.

More particularly, it is an object to achieve the inherent verification of computer operation of computer-monitored parameters, such as hours of operation and of rest periods of non-operation, should they occur, and also verification of the non-monitored circumstance of the identification of different drivers in consecutive ten hour driving shifts.

The description of the invention which follows, together with the accompanying drawings should not be construed as limiting the invention to the example shown and described, because those skilled in the art to which this invention appertains will be able to devise other forms thereof within the ambit of the appended claims.

U.S. Pat. 5,740,548

Figure 1:
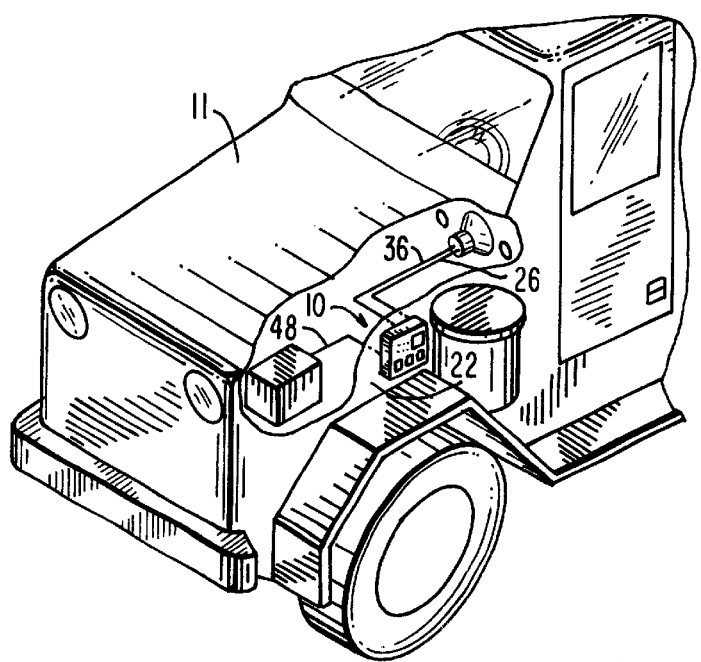
FIG. 1 is a prior art perspective view showing a preferred embodiment of the driver safety parameter display apparatus of the invention of U.S. Pat. No. 5,740,548 permanently attached to a portion of the driver side of a truck.
Figure 2:
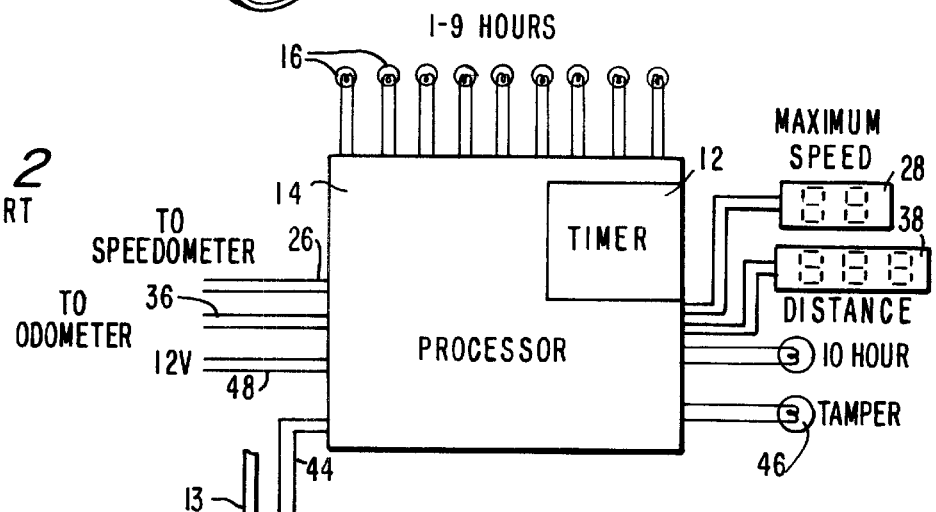
FIG. 2 is a prior art block diagram of the major electronic sub-systems in the driver safety parameter display apparatus of FIG. 1.
Figure 4:
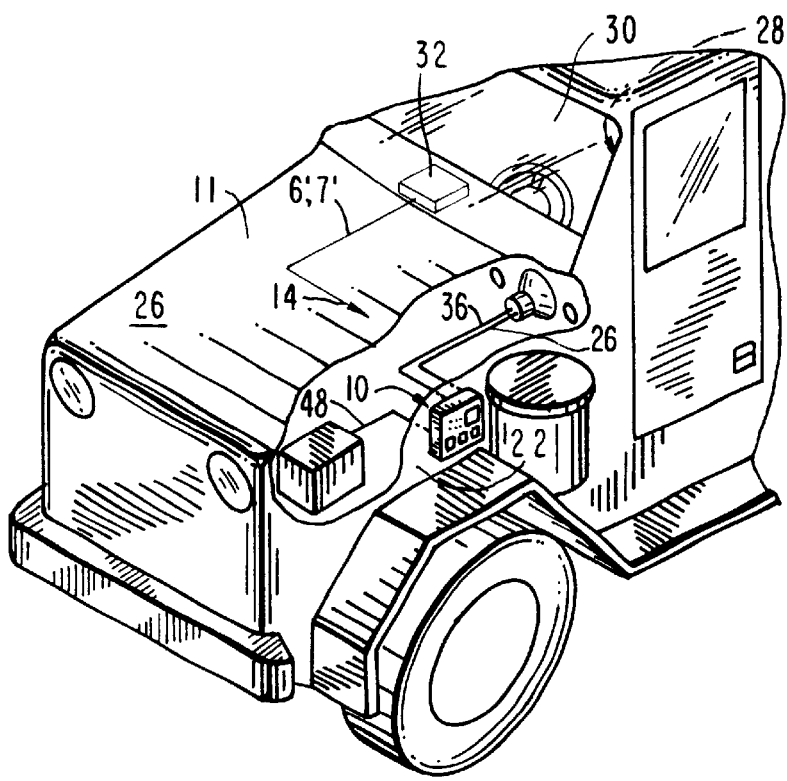
FIG. 4 is a perspective view of the within inventive method of producing a verified common carrier truck log, as to its driver identification content, using the '548 technology of FIGS. 1, 2 in combination with the technology of '773.

Turning to FIGS. 1 and 4, there is shown an exemplary embodiment of the driver safety parameter display apparatus of the invention generally designated by reference numeral 10. In its preferred form, driver safety parameter display apparatus 10 is provided for a motor vehicle 11 and includes a housing assembly 13 and a timer assembly 12 housed within the housing assembly 13 for recording time data for time of operation of the motor vehicle 11. A computer processor assembly 14 is housed within the housing assembly 13 and is electrically connected to the timer assembly 12 for receiving time data signals from the timer assembly 12. An array of individual illumination assemblies 16 is supported by the housing assembly 13 and is visible from outside the housing assembly 13. The illumination assemblies 16 are electrically connected to the computer processor assembly 14 for indicating sequentially and cumulatively as accumulation of time of operation of the motor vehicle 11. A connector assembly is provided for mechanically connecting the housing assembly 13 to an outside surface of the motor vehicle 11. The connector assembly may be in the form of a plurality of screws or bolts that are used to mechanically connect the housing assembly 13 to a hood panel 22 of the truck 11 shown in FIG. 1. When bolts are used, nuts are also used.

The array of illumination assemblies 16 includes nine illumination assemblies 16 arranged in a matrix of three rows and three columns. The array of illumination assemblies 16 includes a tenth illumination assembly placed aside of matrix of illumination assemblies 16. The matrix of nine illumination assemblies 16 indicates a sequence of one to nine driving hours, and the tenth illumination assembly 13 indicates a tenth driving hour.

A maximum speed indicator assembly includes electrical conductors 26 connected to a speedometer which provides an electrical speed signal. The electrical conductors 26 are also connected to the computer processor assembly 14 which processes electrical speed signals received through the electrical conductors 26. A digital speed display module 28 is electrically connected to the computer processor assembly 14 for displaying a maximum speed obtained by the speedometer.

A cumulative mileage indicator assembly includes electrical conductors 36 connected to an odometer which provides an electrical cumulative mileage signal. The electrical conductors 36 are also connected to the computer processor assembly 14 for processing electrical cumulative mileage signals received through the electrical conductors 36. A digital cumulative distance display module 38 is electrically connected to the computer processor assembly 14 for displaying a cumulative mileage obtained by the odometer.

A tamper indication assembly is provided which includes a switch assembly 42 actuated by displacement of the housing assembly 13. Electrical conductors 44 are connected between the switch assembly 42 and the computer processor assembly 14. A tamper indication assembly is provided which includes a switch assembly 42 actuated by displacement of the housing assembly 13. Electrical conductors 44 are connected between the switch assembly 42 and the computer processor assembly 14. A tamper indication display module 46 is electrically connected to the computer processor assembly 14.

All of the electrical components can be powered by power in electrical conductors 48 from the battery of the motor vehicle 11 which may be a 12 volt battery.

U.S. Pat. No. 4,394,773

Figure 3:
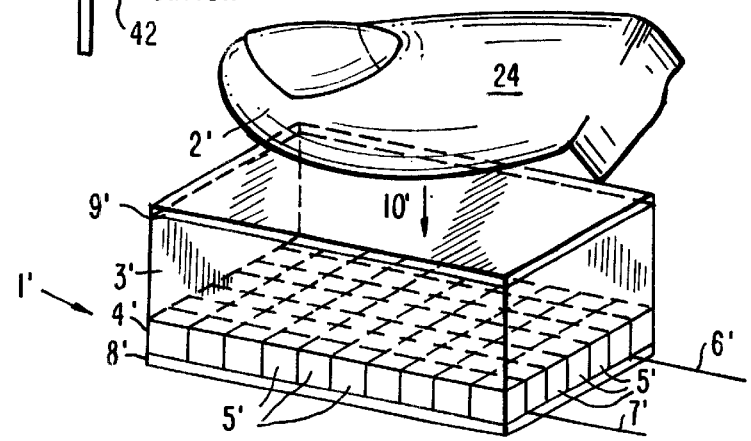
FIG. 3 is likewise a prior art perspective view of an embodiment of a fingerprint sensor according to the invention of U.S. Pat. No. 4,394,773 having a contact device containing a piezoelectric polymer or ceramic material, and a sensor matrix for determination of electric charges on the piezoelectric material.

With reference to FIG. 3, a fingerprint sensor 1' for transmitting the fingerprint information of a finger 2' into an electric output signal a is illustrated. The fingerprint sensor 1' senses the distribution of the ridges and valleys of the skin. It contains two main components: a sensing element or contact device 3' and an electrical charge measuring device 4'.

The contact device 3' consists of a homogeneous piezoelectric material, for instance, a piezoelectric ceramic, or preferably, a flexible piezoelectric polymer such as polyvinylidene fluoride (PVDF). It has the shape of a rectangular sheet or layer. Attached to the lower end face of the contact device 3' is the charge determining device 4'. This device 4' consists of an array of a great number of sensor elements 5'. These elements 5' allow for measuring the electric charge in areas which are as small as or even smaller than the ridges and valleys of the finger 1'. Therefore, there are actually used many more elements 5' than illustrated. In the embodiment of FIG. 3, the sensor elements 5' are arranged in a form of a rectangular sensor matrix. As will be explained below, also other arrangements can be chosen. The sensor matrix may be attached to the contact device by means of a cement. It may also be evaporated to the lower face end as a film, or it may have been attached in a galvanic process. Depending on the kind of device 4' which is used, also the other attachments can be applied.

As can be seen in FIG. 3, two output lines 6' and 7' are connected to the charge determining device 4' for deriving the electric output signal a which corresponds to the relief of the fingerprint.

In a specific embodiment, the lower end face of the charge determining device 4' may rest on a support sheet 8' made of an insulating material.

The upper face end of the contact device 3' may be provided with a very thin cover 9' which may be a protective coating or an electrode for determining other parameters. Such an electrode may be used, for instance, to check the temperature of the contact device 3'. Such an electrode can also be used to pick up information about the heart beat of the person contacting the surface. In other words, the information can be used in an EKG for further investigation.

As soon as the finger 1' touches the upper end face of the contact device 3'; and exercises some pressure thereon in the direction of the arrow 10', an inhomogeneous distribution of electric dipoles is created in the contact device 3'. The axes of the dipoles are arranged perpendicularly to the plane surface. The distribution of the electric charges across the surface is an exact copy of the structure of the fingerprint. That is, locations of flow density of charges correspond to valleys in the surface structure of the finger 1', whereas locations of high electron charges correspond to crests in the surface structure of the finger 1'. The distribution of locations of high and low charge is sensed by the charge determining device 4. Each sensor element 5' supplies a signal corresponding to the charge of the segment of the piezoelectric material to which it is assigned. The more sensor elements 5' are present, the better and the more accurate is the information about the fingerprint. Thus, the more sensor elements are used, the higher will be the resolution.

DESCRIPTION OF THE PREFERRED EMBODIMENT

From the foregoing description it should be readily appreciated by those well versed in the computer art that the computer 14 operatively connected to, for example, the odometer can readily determine from the operation of the odometer the miles traveled during a driving shift and, even more significant, that travel is occurring and that from an operative connection to the timer 12 can determine the time intervals of driving and non-driving of the truck 11, and that this information being monitored by the computer 14 can be downloaded on a paper substrate 20 constituting a truck operation log 22, the contents of which are verified as accurate by the inherent operation of the computer 14. Stated otherwise, it is unlikely that the computer 14, odometer, timer 12, and like apparatus being monitored can be tampered with by a driver 24 to produce ersatz information.

Underlying the present invention is the recognition that a circumstance not monitored by the computer 14, and thus lacking computer operation-verification, is the identity of an individual during a 10-hour shift. Rather, this specific information has heretofore been provided by the driver 24, or his employer or the like and, as such, is at the option of the individual either accurate or intentionally inaccurate. If the latter, the inaccuracy is difficult to detect and has given rise to the regulation-circumventing ploy of ascribing a driving shift to a "phantom" driver.

It is helpful to describe the monitoring of the computer 14 of two consecutive 10-hour driving shifts to make it best understood how the computer 14, i.e., the component of the '548 patent, and the fingerprint sensor 1', i.e., the component of the '773 patent, have a utility in combination with each other which exceeds the utility of each of these components used separately.

The computer 14 is placed into its truck operation-monitoring service in any appropriate well understood manner, or as instructed in the '548 patent, to provide what is ultimately to be a log of the consecutive two 10-hour driving shifts. Optionally, either before or after the initiation of the computer-monitoring service, the fingerprint sensor 1' is used and, by virtue of being electrically connected to the ignition circuit of the truck 11, or in some other appropriate well understood manner, requires the noted use of the fingerprint sensor before the motor 26 of the truck 11 can be started.

Figure 5:
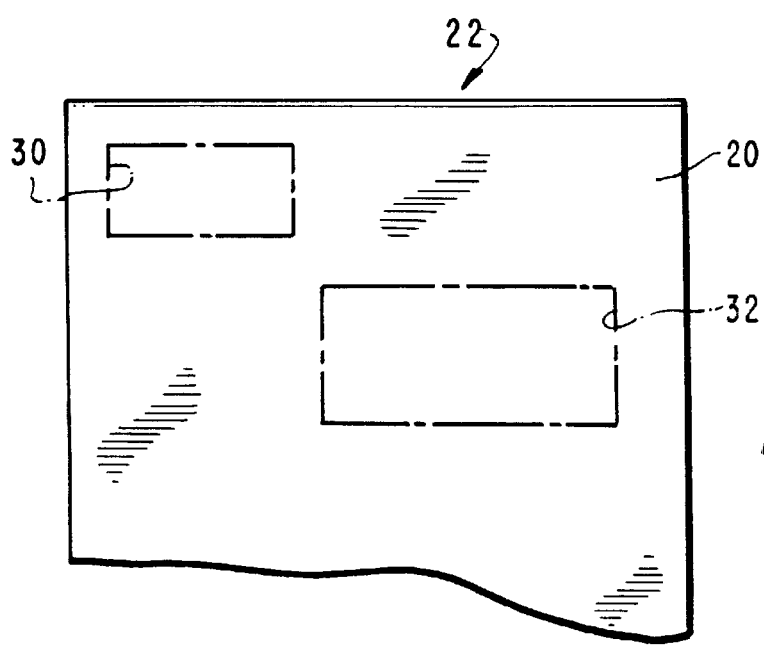
FIG. 5 is a diagrammatic view illustrating a computer-produced common carrier truck log according to the present invention.

In a preferred embodiment, the fingerprint sensor 1' is mounted within easy reach of a driver, such as within the truck cab 28 centrally behind the windshield 30, as at 32. Use of the fingerprint sensor 1' as occurs upon the placement of a finger 2' of the driver upon the fingerprint sensor 1', as best shown in FIG. 3, produces an electrical charge associated with the sensed fingerprint to be transmitted, via the electrical conductors 6' and 7' to the computer 14 which, in a well understood manner, factors in the sensed fingerprint information with the initiation of each of the two 10-hour driving shifts. More particularly, as diagrammatically illustrated in FIG. 5, the downloading of the computer 14 preferably on a paper substrate 20, or merely set forth on a display screen, provides a usable log, generally designated 22, of a fingerprint, as at 30, and of the first 10-hour driving shift, as at 32, and this simple procedure is merely repeated for the second 10-hour driving shift.

It will be understood that there will be of record the fingerprints of the pool of drivers so that from these records there can be verification of the identification of the driver of the second 10-hour shift. More particularly, there is provided by the method described herein verification, by which is meant tamper-proof information in a log 22 of the operation of the common carrier truck 11 that obviates the practice of using a "phantom" driver in a cross-country run which contributes to highway accidents due to driver fatigue.

While the apparatus for practicing the within inventive method, as well as said method herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. In a known method of producing a log of the operation of a common carrier truck comprising the steps of embodying a computer on said truck, timing the start and end of a time interval, monitoring with said computer during said time interval the operation of said truck, printing a log of said computer-monitoring, and ascribing the identification of said printed log of a driver providing said monitored operation, the improvement comprising embodying said truck with a known fingerprint sensor, recording for comparison a fingerprint of a selected individual designated as a driver of said truck, fingerprinting preparatory to operation of said truck an individual undertaking driving control of said truck using said fingerprint sensor, imprinting said fingerprint sensor-obtained fingerprint on said log of said computer-monitoring, and comparing said recorded fingerprint and said log-imprinted-fingerprint to determine any identical relationship therebetween, to thereby provide verification of an operational factor not monitored by said computer of the identity of the driver of said truck during said monitored time interval of the operation thereof.

* * * * *